United States Patent [19]

Bernier

[11] 4,004,536

[45] Jan. 25, 1977

[54] ANTI-SKID BOAT

[76] Inventor: Claude Bernier, 1203 Boul. Mont-Royal, West Montreal, Quebec, Canada, H2V 2H7

[22] Filed: Mar. 17, 1975

[21] Appl. No.: 559,337

[52] U.S. Cl. .......................... 114/144 R; 114/274; 114/126; 114/142; 114/152

[51] Int. Cl.² .................................. B63H 25/08

[58] Field of Search ............ 114/126, 56, 142, 152, 114/144 R, 66.5 R, 66.5 P; 115/70

[56] References Cited

UNITED STATES PATENTS

| | | | |
|---|---|---|---|
| 2,998,791 | 9/1961 | Light | 114/126 |
| 3,081,729 | 3/1963 | Lee | 114/66.5 R |
| 3,373,715 | 3/1968 | Stacey | 115/70 |
| 3,433,201 | 3/1969 | Brown et al. | 115/70 |
| 3,456,611 | 7/1969 | Johnson | 114/66.5 H |
| 3,581,696 | 6/1971 | Ilon | 114/66.5 P |

Primary Examiner—George E. A. Halvosa
Assistant Examiner—Gregory W. O'Connor
Attorney, Agent, or Firm—Bacon & Thomas

[57] ABSTRACT

A boat is provided with an elongated vane extending along each side of the hull. This vane is supported in a closely spaced relationship with the hull's surface to define a longitudinally extending slot. The vanes so positioned reduce the tendency of the boat hull to drift out on turns, by biting into the water. These vanes may be provided with mechanisms to close off the slot when not needed.

40 Claims, 26 Drawing Figures

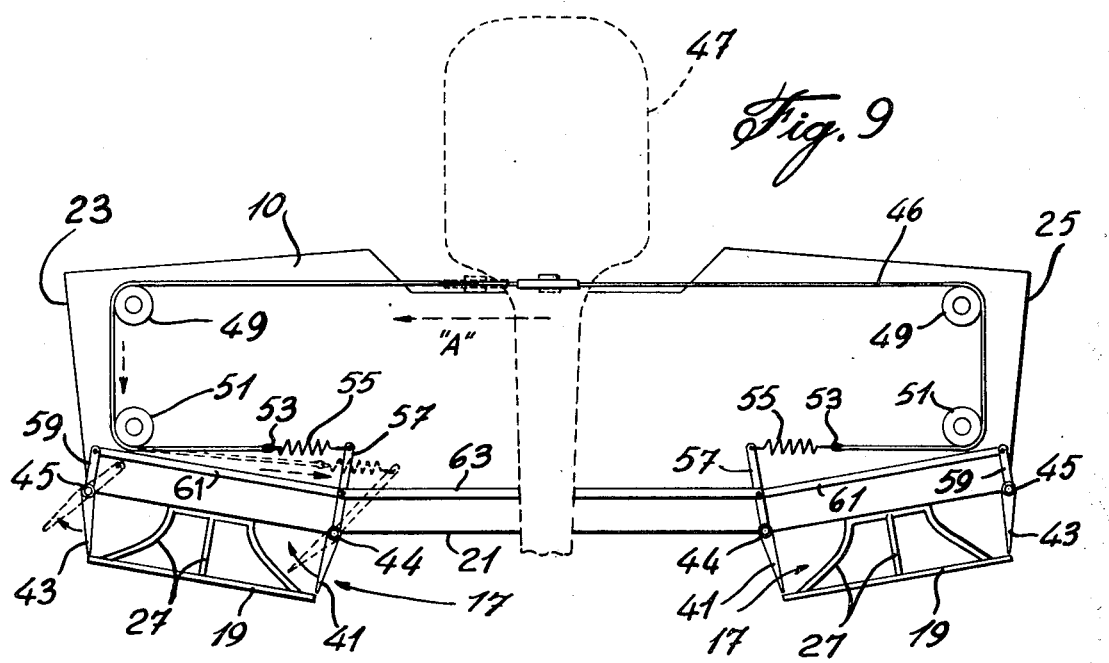
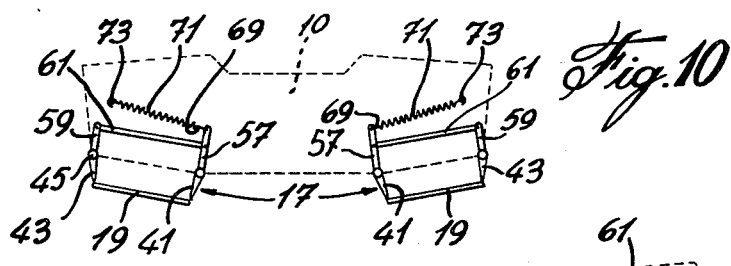
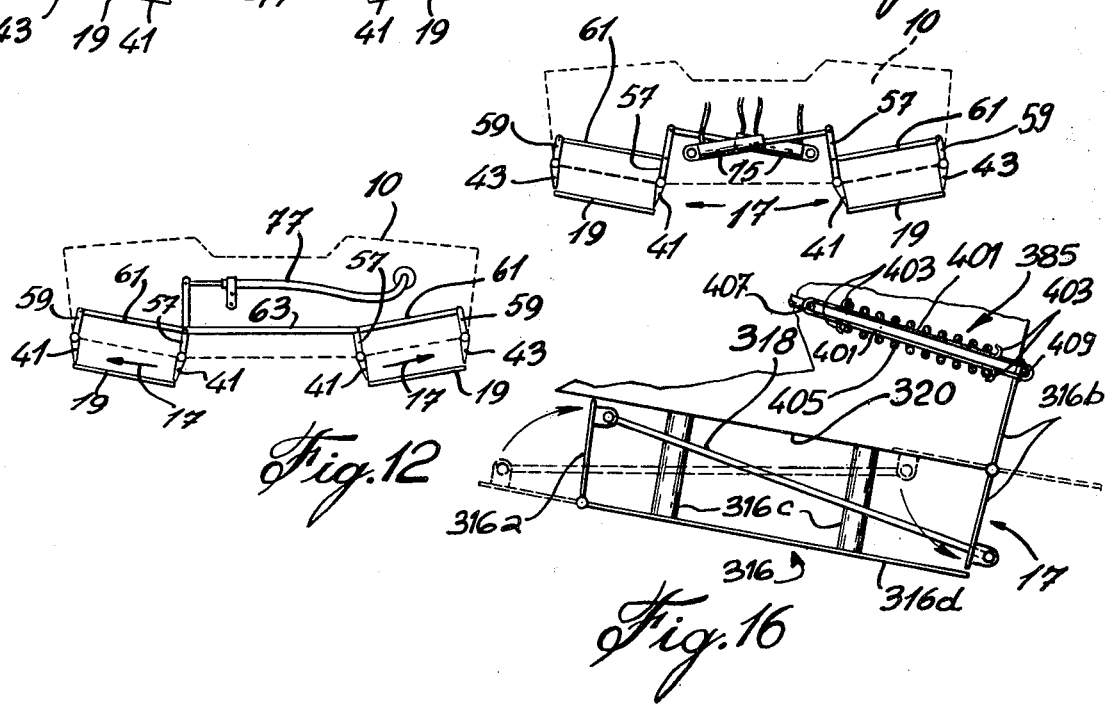

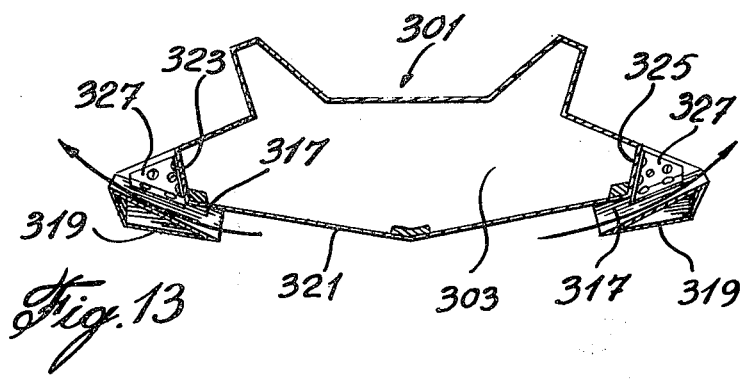
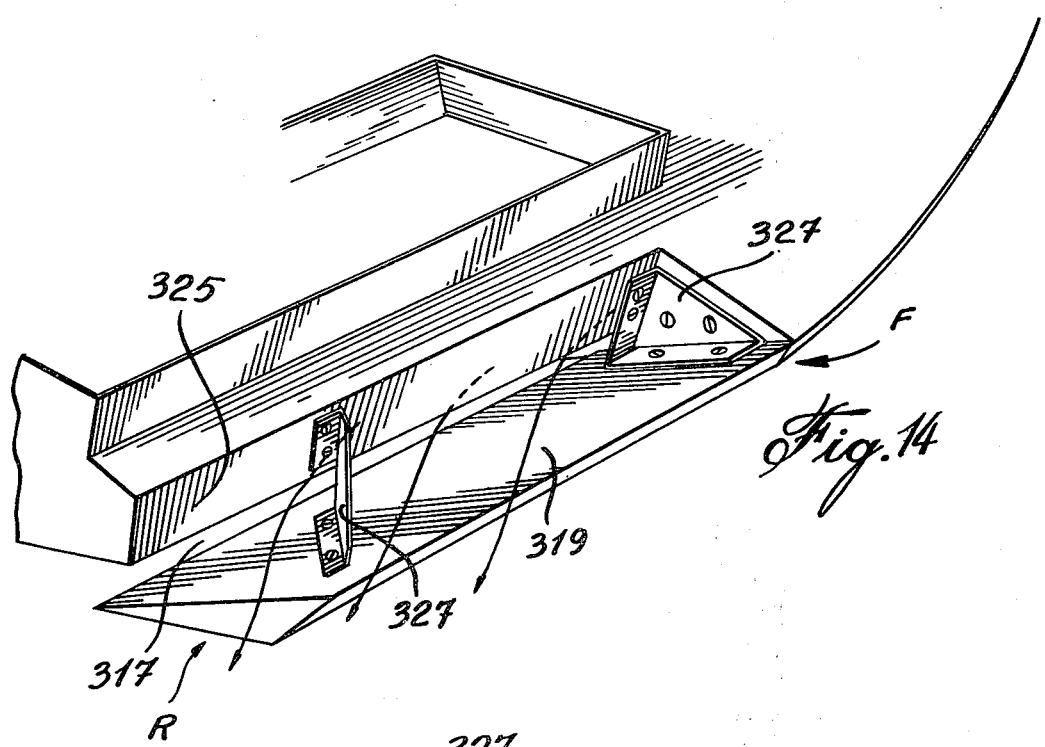
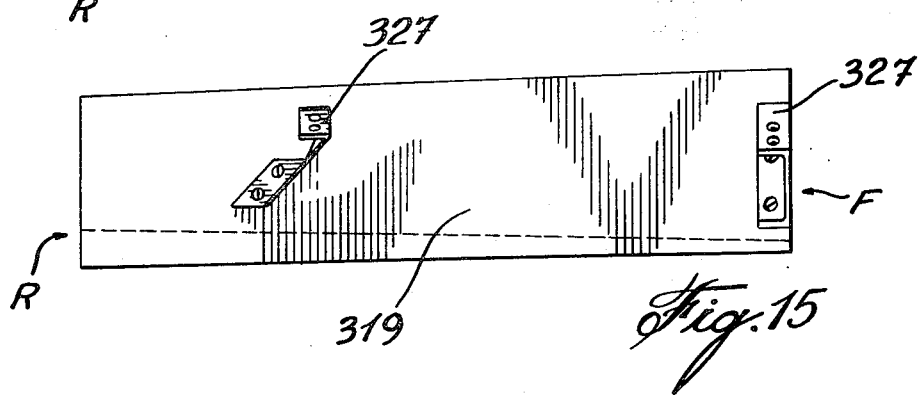

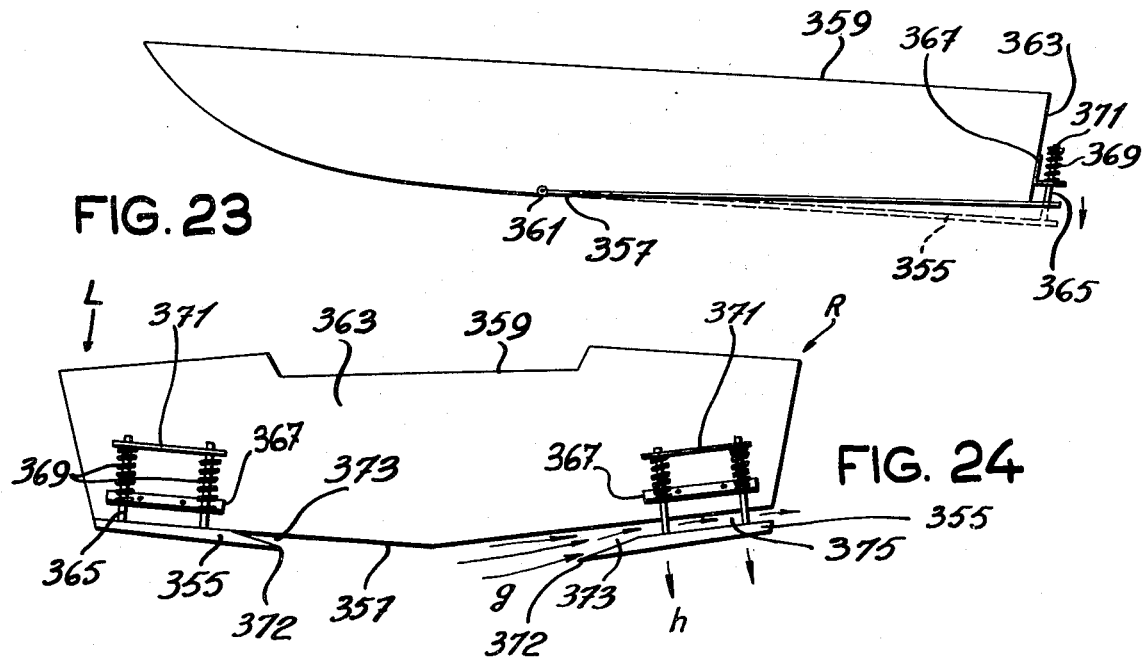
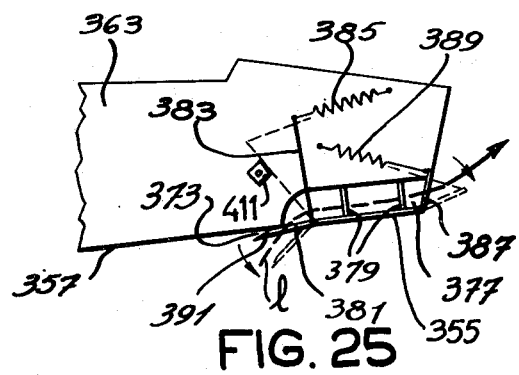
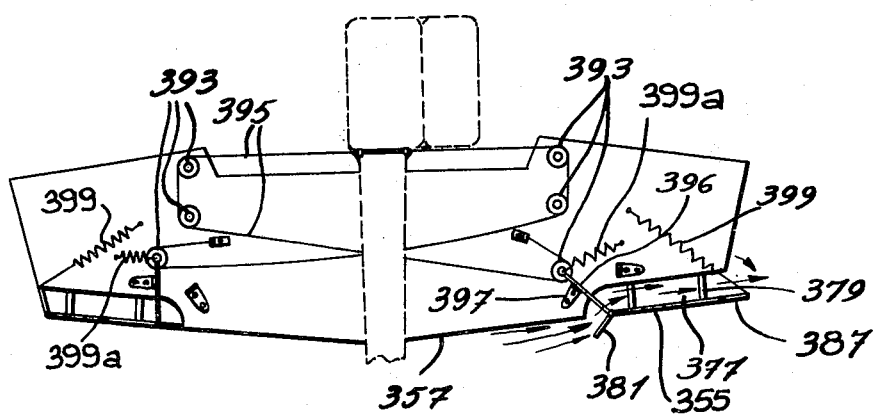

ANTI-SKID BOAT

This invention relates to improvements in boats.

The invention is more particularly directed toward improvements in boats which improvements assist the boats in turning.

Boats, particularly small, fast pleasure crafts have a tendency to drift or slide out in a direction away from the turn when making high speed turns. The turns thus are relatively wide and take longer to make which is a disadvantage when going fast boats.

It is the purpose of the present invention to provide improvements in boats which will reduce the tendency of the boats to slide or drift during turns thereby assisting them to make faster, sharper turns.

The boats of the present invention are provided with means on each side of the hull of the boat to reduce the tendency of the boat to drift out during a turn in either direction. The means on the right side of the hull reduces the tendency of the boat to drift out in a direction toward the left side during a turn to the right side while the means on the left side of the hull reduces the tendency of the boat to drift out in a direction toward the right side during a turn to the left side.

This means on each side of the hull comprises structure defining a longitudinal slot. The structure is a vane attached to, but having a major portion of its length spaced from the hull.

In operation, when the boat is turned in either direction, the vane on that particular side "grasp" or "bites" the water and this, together with the resistance to water flowing laterally through the slot defined by that vane maintain the interior side of the boat anchored to the water while the force of the motor makes pivot the boat around this point acting as a still moving pivot, thus reducing the tendency of the boat to slide or drift.

Means can preferably be provided to close the sides of the slots while the boat travels a generally straight line so as to reduce drag or resistance created by the slots. The slots can be automatically opened as the boat is turned.

The invention will now be described in detail having reference to the accompanying drawings in which:

FIG. 9 is an elevation view showing one embodiment of controls forming an additional part of the present invention;

FIG. 10, 11 and 12 are elevation views showing other embodiments of controls;

FIG. 13 is a rear elevation view of a boat showing another embodiment according to the present invention;

FIG. 14 is a side view of the embodiment shown in FIG. 13;

FIG. 15 is a top view of a vane according to the embodiment shown in FIGS. 13 and 14;

FIG. 16 is a schematic detail of a further embodiment of a vane according to the present invention; FIG. 16 appears on the sheet containing FIGS. 9 to 12;

FIG. 23 is a side view of a boat provided with a further embodiment of the present invention;

FIG. 24 is a rear view of the boat shown in the embodiment of FIG. 23;

FIG. 25 is a partial rear view of a boat provided with a further embodiment of the present invention;

FIG. 26 is a rear view of a boat provided with a further embodiment of the present invention.

Figure 1:
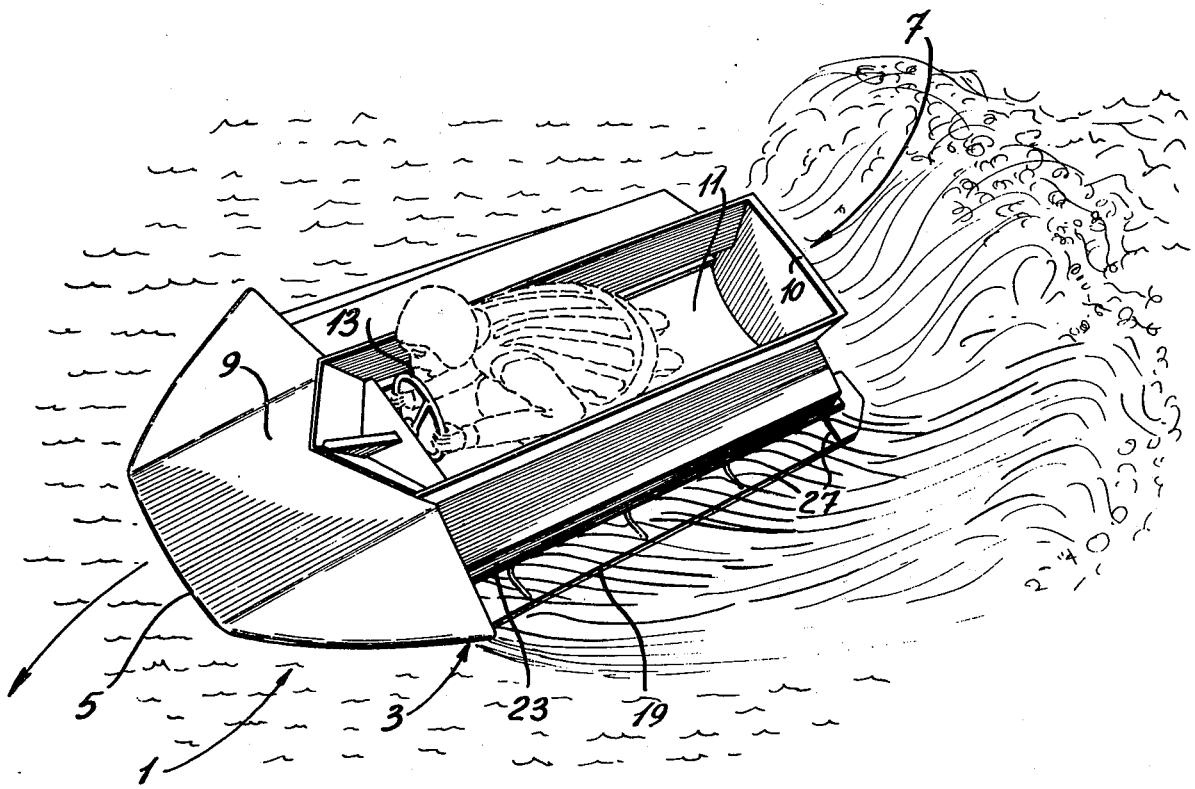
FIG. 1 is a perspective view of a boat showing one embodiment of the present invention.
Figure 2:
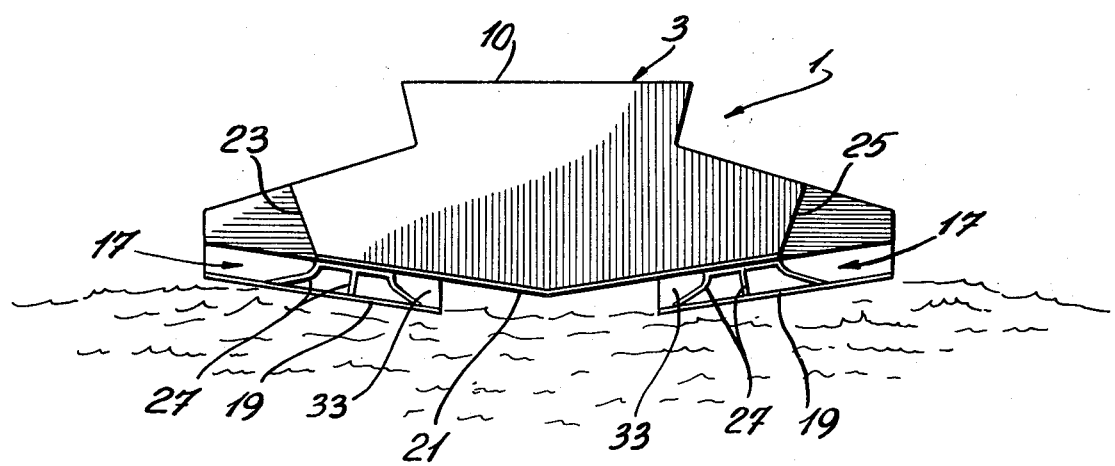
FIG. 2 is a rear elevation view of the boat shown in FIG. 1 as it travels in a straight line.

The boat 1 of the present invention, as shown in FIGS. 1 to 5, is of the small, motor driven, pleasure type. The boat 1 has a hull 3 with a bow end 5 and a stern end 7. The engine (not shown) for the boat can be of the inboard type mounted in the hull 3, in an engine compartment 9 adjacent the bow end 5. Alternatively, the engine (not shown) can be of the outboard type mounted on the transom 10 at the stern end 7. The boat can have a cockpit 11 behind the engine compartment 9 in which the driver of the boat, and any passengers ride. Control means for the boat are located in the cockpit, including a steering wheel 13. The steering wheel 13 operates a rudder 15 (FIGS. 4 and 5) or an outboard engine or other rudder-like means to steer the boat.

Figure 4:
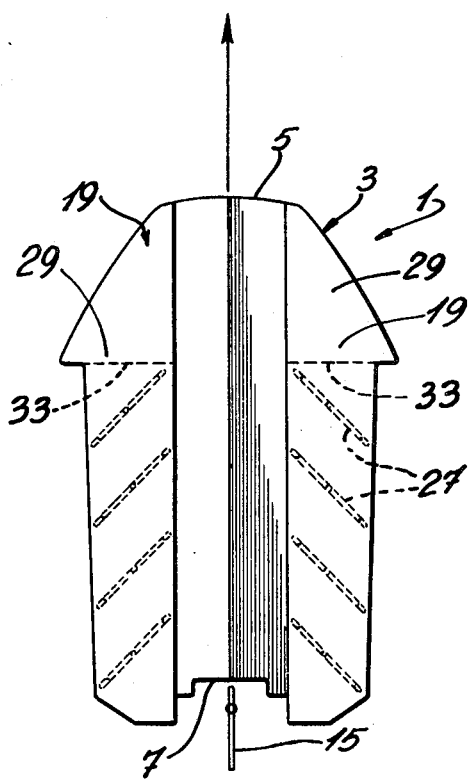
FIG. 4 is a bottom plan view of the boat as it travels in a straight line.
Figure 5:
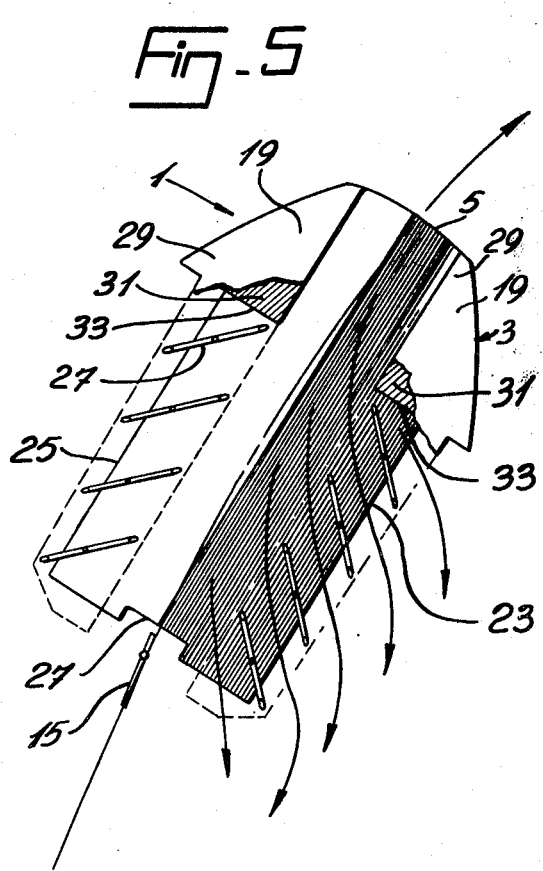
FIG. 5 is a bottom plan view, in partial section, of the boat turning.

Means are provided on the boat to minimize the tendency of the boat to drift out during a turn in either direction when the steering wheel is operated. These means comprise a slot 17 on each side of the hull 3. Each slot 17 is defined by a vane 19 mounted on the hull 3. Vanes 19 extend in a longitudinal direction along the hull 3 as shown in FIGS. 4 or 5.

In a hull 3 of the type shown in FIGS. 1 to 5 which has a substantially flat bottom 21 and vertical extending sides 23, 25, the vanes 19 are connected to the hull bottom 21 adjacent and along lateral sides 23, 25. The vanes 19, in the flat-bottomed type of boat hull 3, extend substantially parallel to the bottom 21, but have a major portion of their length spaced a short distance from the bottom 21. This space, between the major portion of the vane and the hull bottom 21, forms the elongated, longitudinal extending slot 17 through which water can pass to aid in turning the boat as will be described. The vanes 19 are maintained in spaced position relative to the hull bottom 21 by thin connecting members 27. To provide the least resistance to water, the members 27 preferably are made from rod material of suitable strength. Also, in order to provide as little resistance to water as possible as the boat travels forward, the front portion 29 of the vanes 19 are joined directly to the hull 3. In order to provide a transition from where each vane is joined directly to the hull to where the vane is spaced from the hull bottom to form the slot, the front portion 31 of the hull 3, beneath each vane, preferably slopes down. This front portion 31 is joined to the rest of the hull bottom by a vertical step 33. The front portion 29 of vane 19 is joined directly to the front portion 31 of hull 3 to minimize resistance to water and the rest of the vane 19, rearwardly past step 33, is spaced from the hull by connecting members 27 to form the slot 17.

Figure 3:
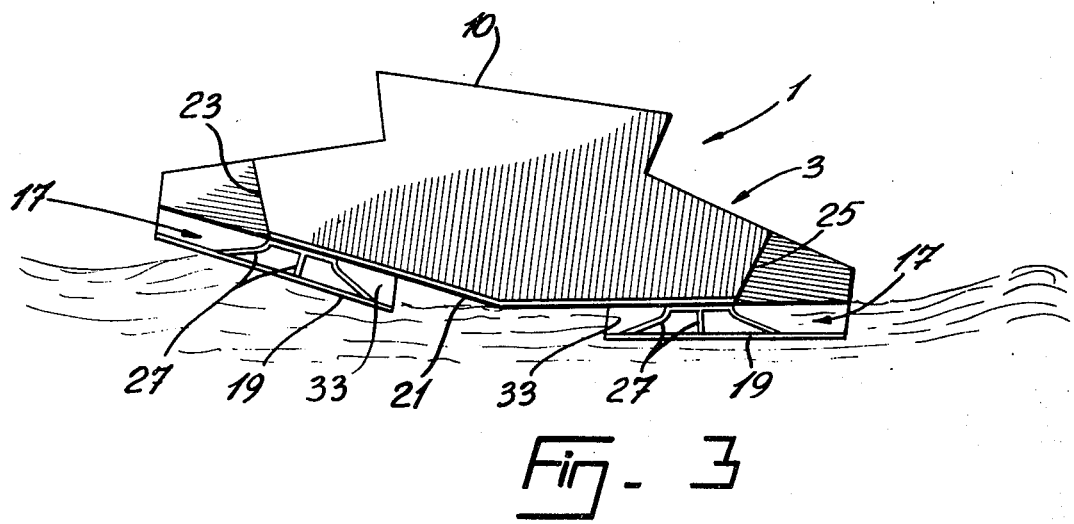
FIG. 3 is a view similar to FIG. 2 but with the boat turning.

In operation, one of the vanes 19 serves to "grab" or "bite" into the water as the boat turns, depending on which direction the boat turns. If for example, the boat is steered to turn to the right by rudder or outboard motor 15, (FIG. 5), the boat without the vanes would tend to slide or drift out toward the left. Equipped with the vanes 19 however, as the boat turns to the right, the right side of the boat dips down as shown in FIG. 3 and with vane 19 on the right side submerged in the water, the vane tends to act as a brake, providing a holding or braking action which tends to reduce drifting of the boat to the left as the boat turns to the right. In addition, by the water, which passes generally transversely through the slot 17 serving to act as a brake reducing the tendency of the boat to slide, the vane 19 is retained and acts as a still moving pivot forced to remain anchored and about which the boat turns more sharply. When turning in the opposite direction or to the left, the other slot 17 and vane 19 apply the braking or holding effect. The sharper the turn, the creater the effect of the vanes 19. When the boat is moving at high speed in a relatively straight line and even at low speeds if the boat is equipped with further elements as described in later paragraphs, the slots and vanes provide little resistance.

Figure 6:
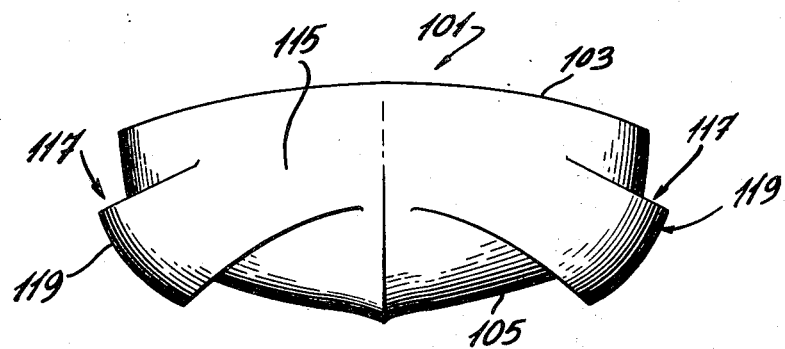
FIG. 6 is a front elevation view of a boat showing another embodiment of the present invention.
Figure 7:
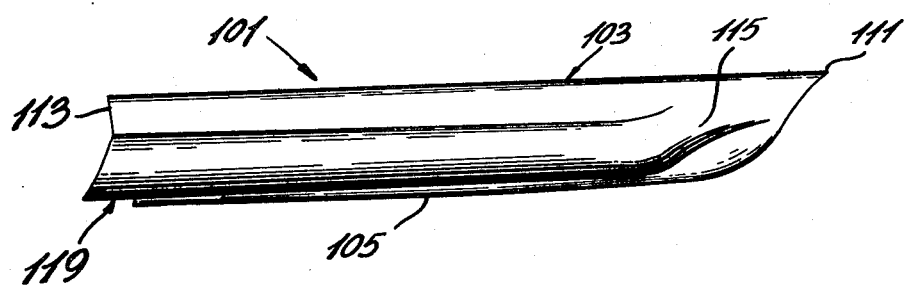
FIG. 7 is a side elevation view of the boat shown in FIG. 6.

The vanes 19 can be employed on boats having other types of hulls as well as on the flat-bottomed hull 3 just described. As shown in FIGS. 6 and 7, vanes 119 are provided on a boat 101 with a hull 103 having a rounded bottom 105. In this embodiment, the vanes 119 can, in cross-section, be curved to follow the curvature of the hull bottom 105. The vanes 119 are still spaced a short distance from the hull by suitable connecting means, to form slots 117 and the vanes 119 extend on either side of the hull generally from the bow 111 to the stern 113. The front portion 115 of the vanes is integrally joined to the hull adjacent the bow 111 so as to minimize water resistance when the boat travels in a generally forward direction. In this embodiment, it will be noted that the vanes 119 curve upwardly at their front end whereas the vanes 19 in the first embodiment, on the flat-bottomed boat are substantially horizontal. In this second embodiment, the vanes 119 may not be entirely submerged during general forward movement of the boat but they will submerge in the water as the boat is turned, due to the boat rolling on its rounded bottom.

Figure 8:
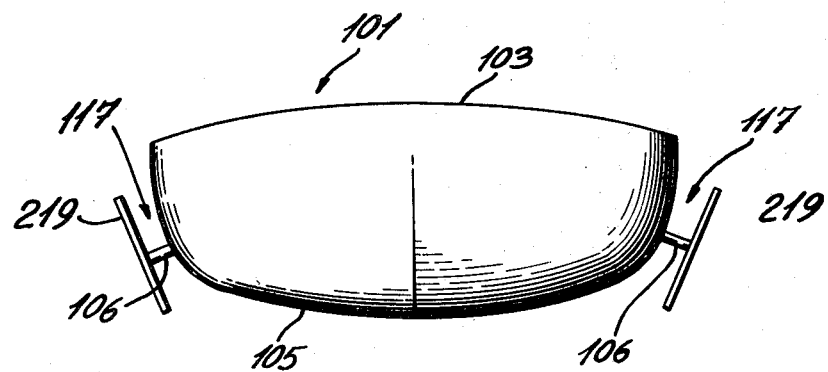
FIG. 8 is a front elevation view of a boat showing still another embodiment of the present invention.

The vanes 119 need not have a cross-sectional shape which follows the curvature of the boat hull. As shown in FIG. 8, a boat 101 having a hull 103 with a rounded bottom wall 105 could have vanes 219 which are substantially straight in cross-section instead of curved. The vanes 219 slope upwardly and are spaced from the hull 103, by suitable connecting means 106 to form slots 117 as before.

To reduce even further, any resistance offered by the slots and vanes as the boat travels in generally straight line, means can be provided for normally closing the longitudinal sides of the slots. Thus, as shown in FIG. 9, the longitudinal sides of slots 17 formed between vanes 19 and the hull bottom 21 can be normally closed with movable walls 41, 43, The walls 41, 43 are connected by pivot means 44, 45 respectively to hull bottom 21.

Suitable means are provided for opening and closing the walls 41, 43 of the slots 17 when the boat is turned in either direction. These wall opening and closing means, as shown in FIG. 9 can comprise a cable and pulley system. The system includes a flexible cable member 46 connected to an outboard motor 47 which is used to propel the boat. The member 46, passes over a pair of pulleys 49, 51 on each side 23, 25 of the boat and which can be mounted on the outside of transom 10. The ends 53 of the cable, are attached, via a spring 55 to the end of a lever 57, which is pivotably connected to pivot means 44 and fixedly connected to movable inner wall 41. A second lever 59 is pivotably connected to pivot means 45 and fixedly connected to movable outer wall 43. A first link 61 is pivotably connected between the end of second lever 59 and the first lever 57 below its end. A second link 63 is pivotably connected between levers 57.

In operation, if it is desired to turn the boat to the left, as shown in FIG. 9, the rear of the outboard motor 47 is pivoted to the left as shown by arrow "A". Cable 46, via its connection to motor 47 thus also moves to the left at the top of the transom 10 and to the right at the bottom of the transom 10. As the cable 46 moves to the right, it allows walls 41, 43 normally closing slot 17 to pivot to the left, thus opening up the slot and allowing water to flow through the slot. The water flow, and the action of the vane 19 "biting" or "grabbing" in the water permits the boat to make a tighter turn. The spring 55 absorbs any flutter and angle defects in the system. As the boat straightens out of the turn and the motor is pivoted back, cable 46 is also moved back closing walls 41, 43 about pivots 44, 45 to close the slot 17 and thus reduce resistance as the boat travels in a straight line. While walls 41, 43 on slot 17 on the left side move to the left as the boat turns to the left, so do walls 41, 43 on slot 17 on the right side, as a result of cable movement, and the movement of links 61, 63. This movement of the right side walls is not important however. If the boat turns to the right, the walls move to the right permitting the right hand slot 17 to open with water flowing through the slot and to have the vane 19 bite so as to turn more sharply to the right.

In another embodiment, as shown in FIG. 10, the cable and pulley system shown in FIG. 9 can be replaced with a simple spring system. The ends of levers 57, instead of being connected to the ends of the cable, are merely connected to one end 69 of a spring 71, the other end 73 of which is connected to the transom 10. The spring 71 serves to keep wall 41, and wall 43 via connecting link 61 and second lever 59, closed during straight line movement. As the boat turns however, in either direction, water forces the appropriate walls open against the action of the spring 71 which may be a stop-spring as explained later to open the slot 17 allowing water to flow through and allowing the vane 19 to grab or bite the water.

If desired, the levers 57 could instead be operated by hydraulic or pneumatic cylinders cylinders 75 properly actuated in the proper sequence during turning of the boat to open the walls in the appropriate direction. These cylinders 75 are shown in FIG. 11.

In still another embodiment, the walls could be manually actuated by operation of a bowden cable 77 from the cockpit connected to one of the levers 57 through the transom 10. The one lever is connected to the other levers 57, 59 by connecting links 61, 63 as previously described.

In the embodiment shown in FIGS. 13 to 15 the vanes 319 are in such a form as to serve also as floating means for the boat 301 when heavier motor means are installed therein.

Vanes 319 are connected to the hull bottom 321 of the boat 301 adjacent and along lateral sides 323 and 325 by means of braces 327. As it is clear from the drawings the general form of the boat shown in FIGS. 13 to 15 is substantially similar to the general form of the boat shown in FIGS. 1 to 3.

Each vane 319 has in cross-section the form of a triangle as clearly shown in FIG. 14, the triangle may have a height greater at the rearward part R of the vane than the forward part F or it may have a uniform height.

Slots 317 are provided between the lateral sides 323, 325 of the hull 303 and vanes 319 for performing the same function of permitting water passing through as the slots 17 in the embodiments of FIGS. 1 to 5.

The triangular form of the vane creates a restriction to the water, thus providing a better pivot around which the boat pivots by the force of the motor. The tons of water rowed over the vane literally anchors the side of the boat situated inside the turning curve to the water. The overall of the boat is thus greatly stopped such that the propeller stays in the water.

In the embodiment shown in FIG. 16, a vane 316 is formed of a median part 316d which is fixedly connected by studs 316c to the rear left side of the bottom 320 of the hull and of lateral parts 316a and 316b hinged respectively to the median part 316d.

The hinged lateral parts 316a and 316b of the vane 316 can be automatically brought by means of a rod 318 and under the action of a stop-spring 385 described later into a closed position, as shown in full lines, closing the slot 17 as in the embodiment of FIG. 10 and presenting a smaller surface of contact with the water when the boat is running in direct line at high speed or when the boat is not too loaded. The parts 316a and 316b can be brought by the rod 318, against the action of the stop-spring 385 and under the force of the water as explained for the embodiment of FIG. 10 into the open position, as shown in dashed lines, thus opening the slot 17 and presenting a greater surface of contact with the water when the boat is negotiating curves. The stop-spring 385 automatically brings lateral parts 316a and 316b into their closed position, when the force of the water is not enough to open these parts against the action of the stop-spring.

Figure 17:
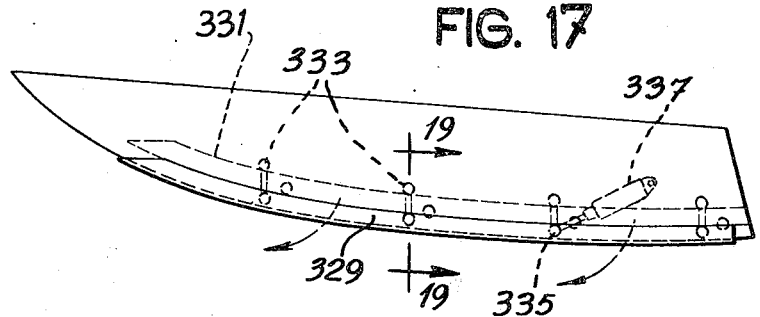
FIG. 17 is a schematic side view of a boat provided with a further embodiment of a vane according to the present invention.
Figures 18, 19:
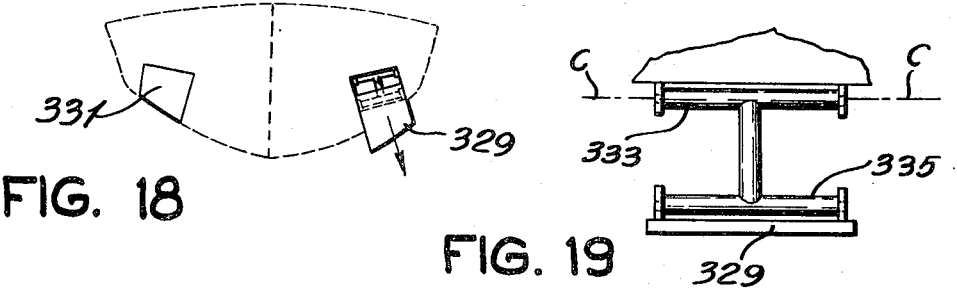
FIG. 18 is a schematic front view of the embodiment shown in FIG. 17.
FIG. 19 is a view along line 19—19 of the vane and the means attaching it to the boat according to the embodiment shown in FIG. 17.

In the embodiment shown in FIGS. 17, 18 and 19, the vanes 329 may be located inside groove 331 provided at the lower part of the hull and at each side of the median of the hull. There is provided a vane 329 at each side of the boat as schematically shown in FIG. 18. The particularity of this embodiment is that each vane is retractably connected to the hull of the boat. The retractable means are formed of I-shaped frameworks, the upper horizontal arm 333 of each being pivotally connected inside groove 331 to the hull of the boat around an axis C—C. The lower horizontal arm 335 is connected to the vane 329 and is adapted to be retracted inside and extended out of groove 331, along with the vane attached to it by appropriate actuation means such as pneumatic or hydraulic jacks 337 or the like.

Figure 20:
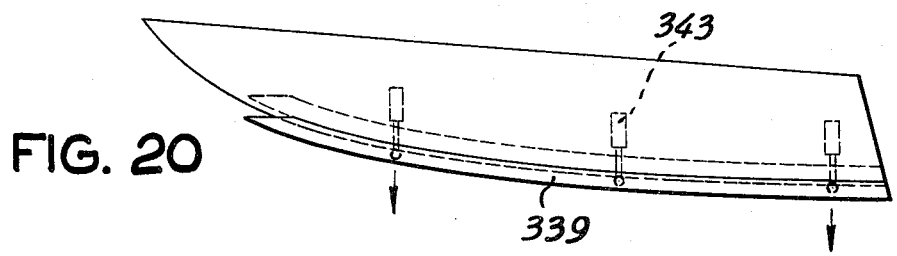
FIG. 20 is a schematic side view of a further embodiment of attaching means of a vane to a boat.
Figure 21:
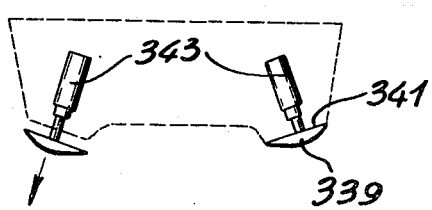
FIG. 21 is a schematic rear view of the embodiment shown in FIG. 20.

In the embodiment shown in FIGS. 20 and 21, the vanes 339 are ejected from a retracted position (dashed lines in FIG. 20 and right side vane in FIG. 21) into an extended position (full lines in FIG. 20 and left side vane in FIG. 21). The difference between this embodiment and the embodiment of FIGS. 17, 18 and 19 is that the vanes are retracted by more than one jack or cylinder on each side and have a vertical downward or upward action. Each vane abuts against an abutment surface 341 in its retracted position and each vane is ejected straight forward outside from the abutment surfaces, instead of being pivoted outside as in the embodiment 17, 18 and 19, by ejection and retraction means such as hydraulic or pneumatic jacks 343 or the like.

Figure 22:
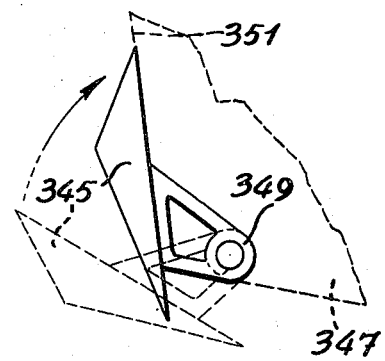
FIG. 22 is a further embodiment of a vane and its means of attachment to a boat.

The embodiment of FIG. 22 shows a vane 345 which is pivotally connected to the bottom 347 of the hull around a pivot 349, the vane 345 being capable of pivoting by means (not shown) into an inoperative abutting position against the side 351 of the hull and into an operative spread out position substantially parallel to the hull as shown in dashed lines.

In the embodiment shown in FIGS. 23 and 24, the boat is provided with a pair of vanes 355, each vane being hinged to the bottom 357 of the hull 359 of the boat around a pivot 361. It should be noted that in this embodiment and also in the embodiments shown in FIGS. 25 and 26, which will be described later, the bottom 357 of the hull is substantially flat as is the case in the embodiment shown in FIGS. 1 to 5 for example.

Each vane 355 is located along the lateral edge portion of the bottom 357 and is connected to the rear wall 363 of the boat by means of rods 365, a pair in this embodiment, slidably passing through holes provided in one of the arms of an iron-angle bracket 367 the other arm of which is secured to the rear wall 363 of the hull. Resilient means, such as springs 369, are provided around rods 365, the springs being located above the bracket, one end of each spring resting on the arm of the bracket provided with the holes for the passage of the rods 365, and the other end of the spring abutting against a bar 371 interconnecting the free ends of the rods 365.

Each vane has a beveled edge 372 projecting toward the center of the bottom and the function of the edges will be explained in the following paragraph.

The mode of operation of this embodiment is as follows. Springs 369 are so tensioned that during a straight line run or advance of the boat the vanes 355 abut against the bottom 357 of the hull as is the case in the left side vane shown in FIG. 24. Thus, the action of the vanes is practically eliminated and the boat runs as if it was not provided with such vanes. However, during the negotiating of a curve to the right, for example, the left side L of the boat (see FIG. 24) is slightly raised from the water and is not subjected to the same pressure of the water as is the right side R (FIG. 24) which acts as a pivot for the boat, as already explained in former paragraphs, and therefore the water has tendency to penetrate (arrow $g$) in the passage 373 formed between the bottom of the boat and the beveled edge 372 of the right vane and thus forces the right vane downwardly (arrow $h$) for creating a passage or slot 375 between the bottom and the right vane, slot which provides the manoeuvre of the boat as explained for the remaining embodiments 1 to 22.

When the boat has completed its rotation to the right, the right vane not being any more subjected to a downward pressure by the water, springs 369 and front coming pressure urge back the right vane to its abutting position against the bottom.

When negotiating left curves, it is the left vane which forms the slot with the bottom in the same way as explained for the right vane.

In the embodiment of FIG. 25, the lateral exterior edges of the bottom 357 of the hull are provided with grooves 377 and each vane 355, which is composed of three parts, one median part and two lateral parts, the lateral parts being respectively hinged to the median part, faces a corresponding groove and is connected to the bottom of the hull by studs 379 thus closing the corresponding groove and restoring the normal non grooved shape of the hull. The studs 379 connect the median part of the vane to the bottom of the hull, whereas the interior lateral part 381 of each vane, left or right, is pivotally connected at its rear end to the rear wall 363 of the boat by means of a lever-arm 383 and a stop-spring 385, the stop-spring being shown in FIG. 16, and the exterior lateral part 387 of each vane is connected to the rear wall 363 of the hull by a further stop-spring 389, the stop-spring being shown in FIG. 16.

The stop-spring 385 as clearly shown in FIG. 16, is formed of two U-shaped staples 401 slidably coupled to each other with their closed ends remote from each other and having curved or hooked ends 403 between which there is provided a coil 405. One of the staple is fixed at point 407 to the rear of the boat and the other staple is fixed to the upper free end 409 of the lateral side 316b. It is evident that the resiliency of the spring is limited by the two hooked ends 403, and therefore the pivoting of the lateral sides 316a and 316b is limited to a predetermined angle thus preventing any damage to the lateral sides 316b and 316b due to the force of water acting on these sides when the boat is negotiating curves.

The non hinged interior lateral edge 391 of the interior part 381 of each vane is beveled.

The mode of operation of this embodiment is substantially the same as in the embodiments of FIGS. 23 to 24. In fact, when turning to the right, for example, the pressure of the water created in the passage 373 forces the interior lateral hinged part 381 of the vane downwardly and opens an inlet which permits the water to flow into the groove 377 (arrow 1, FIG. 25). This flow presses on the exterior lateral hinged part 387 of the vane and pivotally opens it for traversing the entire width of the groove 377. It is of course evident that the resilient means system of stop-spring 385 and lever 383 and stop-spring 389 provides the automatic pivoting of the parts 381 and 387 to open the slot defined by groove 377 and when the turn is completed and there is no more pressure on the lateral edge 391 of interior part 381, automatically bring the hinged parts 381 and 387 to their initial position thus closing the slot defined by the groove 377. A stop 411 for lever 383 further limits the pivoting of part 381.

When turning to the left, it is the left side vane which is subjected to the same steps.

In the embodiment shown in FIG. 26, which is almost the same as the embodiment of FIG. 25 the opening and closing of the groove 377 defining the longitudinal slot is not automatic but is manually controlled by the steering wheel of the boat (not shown) and the motor in combination with a resilient means system of pulleys 393, cables 395 rods 396 brackets 397 and stop-springs 399a connected to the interior lateral hinged part 381 of each vane 355 and stop-springs 399 connected to the exterior lateral hinged part 387 of the vane. The resilient means system being on the other hand connected to the rear wall of the boat.

It is to be noted that in this embodiment the interior lateral hinged part 381 need not be provided with a beveled edge as in the case of the embodiment of FIG. 25 because it is not the pressure of the water that starts pivoting the hinged part 381 but it is the manual control means as above explained.

I claim:

1. A boat having a hull, and means on each side of the hull to reduce the tendency of the boat to drift out during a turn in either direction, the means on the right side of the hull biting into the water and reducing the tendency of the boat to drift out in a direction toward the left side during a turn to the right side and the means on the left side of the hull biting into the water and reducing the tendency of the boat to drift out in a direction toward the right side during a turn to the left side, each said means including: an elongated vane extending substantially longitudinally of said hull; and means for supporting said elongated vane in relatively closely spaced relationship from said hull over a major portion of the length thereof, whereby said vane and said hull form therebetween an elongated, substantially longitudinally extending, relatively narrow slot through which water can flow laterally outwardly from beneath the central portion of the hull during a turn of the boat.

2. A boat as claimed in claim 1, wherein the front portion of each vane merges smoothly into the front portion of the hull to minimize water resistance.

3. A boat as claimed in claim 2, wherein said supporting means supports said elongated vane in a fixed closely spaced relationship with said hull.

4. A boat as claimed in claim 2, wherein said vane extends longitudinally over a major portion of the length of said hull, and lies substantially parallel to said hull over the length thereof.

5. A boat as claimed in claim 1, wherein the hull is substantially flat-bottomed, and there is one vane along each side of the bottom lying in a plane substantially parallel to the plane of the hull bottom.

6. A boat as claimed in claim 1, wherein the hull has a substantially rounded bottom, and there is a vane along each side of the rounded bottom, the front end of each vane extending upwardly.

7. A boat as claimed in claim 6, wherein each vane is curved in cross-section to lie in a plane substantially parallel to the plane of the adjacent hull portion.

8. A boat as claimed in claim 6, wherein each vane is straight in cross-section.

9. A boat as claimed in claim 1, including wall means to close the sides of the slots.

10. A boat having a hull, and means on each side of the hull to reduce the tendency of the boat to drift out during a turn in either direction, the means on the right side of the hull reducing the tendency of the boat to drift out in a direction toward the left side during a turn to the right side and the means on the left side of the hull reducing the tendency of the boat to drift out in a direction toward the right side during a turn to the left side, said means on each side of the hull comprising: a vane extending substantially longitudinally of the boat, and having a major portion of its length spaced from but substantially parallel to the hull to form a longitudinal slot; wall means to close the sides of the slots; and means to move the wall means to open the slots in a manner dependent upon the direction the boat is turned.

11. A boat as claimed in claim 10, wherein the moving means comprise a cable and pulley system connected between an outboard motor on the boat and the wall means.

12. A boat as claimed in claim 10, wherein said means to move the wall means comprises stop-spring means connected between the wall means and the hull to urge the wall means to close the slots.

13. A boat according to claim 12, wherein said stop-spring comprises two U-shaped staples slidable coupled to each other with their closed ends remote from each other, each staple having a hooked end, a coil being provided between the two hooked ends of said staples.

14. A boat as claimed in claim 10, wherein the moving means comprise one of pneumatic actuators, hydraulic actuators, or bowden cables.

15. A boat as claimed in claim 1, wherein said means for supporting said elongated vane in relatively closely spaced relationship from said hull comprises braces.

16. A boat as claimed in claim 1, wherein each vane has in cross-section the form of a triangle, said triangle having a height greater at rearward part of the vane than the forward part thereof.

17. A boat as claimed in claim 1, wherein each vane has in cross-section the form of a triangle, said triangle having a uniform height along the entire length of the vane.

18. A boat as claimed in claim 1, wherein each vane is formed of a median part and lateral parts hinged to the median part, the median part being fixedly connected to the rear bottom of the hull, means being provided for bringing said vane into an open position wherein said lateral hinged parts are extended thus opening the slot and increasing the surface of contact of the vane with the water, said means bringing back said vane into a closed position with the lateral hinged parts are retracted into a position closing the slot and decreasing the surface of contact of the vane with the water.

19. A boat as claimed in claim 18, wherein said means for respectively opening and closing said vane is a rod obliquely hinged to the two lateral hinged parts of the vane, said rod acting respectively against and under the action of a stop-string.

20. A boat according to claim 19, wherein said stop-string comprises two U-shaped staples slidable coupled to each other with their closed ends remote from each other, each staple having a hooked end, a coil being provided between the two hooked ends of said staples.

21. A boat as claimed in claim 1, wherein said hull is provided with grooves arranged at its lower part and at each side of the median of the hull, and wherein said means for supporting said vanes is arranged to pivotally retract each vane inside the corresponding groove, thus bringing the vanes into an inoperative position and extending them out of the grooves into an operative position wherein each vane is spaced from but substantially parallel to the hull to form said slot.

22. A boat as claimed in claim 21, wherein said means for pivotally retracting and extending each vane from each groove comprises I-shaped frameworks the upper arm of each framework being pivotally connected to the hull inside the groove and the lower arm being connected to the vane, actuation means being associated to said I-shaped frameworks and to said boat for actuating said frameworks.

23. A boat as claimed in claim 22, wherein said actuation means is of pneumatic or hydraulic type.

24. A boat as claimed in claim 1, wherein said means for supporting said elongated vane is operable to retract said vane into an inoperative position, and extend said vane into an operative position.

25. A boat as claimed in claim 24, wherein in its retracted position each vane abuts against an abutment surface and in its extended position each vane is substantially remote from said abutment surface thus forming said slot.

26. A boat as claimed in claim 25, wherein said means for supporting said elongated vane includes several actuation means provided in the boat and arranged spaced from each other and connected to each vane.

27. A boat as claimed in claim 1, wherein said vane is pivoted to the bottom of the hull, and wherein said means for supporting said elongated vane includes actuation means for pivoting said vane into an inoperative position in abutment against the side of the hull and into an operative position extending substantially parallel to the hull to form the slot.

28. A boat as claimed in claim 27, wherein said actuation means is of pneumatic or hydraulic type.

29. A boat as claimed in claim 1, wherein said means for supporting said elongated vane includes: means hingedly connecting one end of said vane to the bottom of the hull around a transverse pivot, and means connecting the other end of said vane to the rear wall of the boat, said last mentioned means including resilient means arranged to urge said vane into abutment against the bottom of the hull when the boat is at rest or when it is running in a straight line, said vane being provided on the longitudinal interior edge thereof which extends towards the center of the boat with means operable by water pressure during a right or left turn of said boat to oppose said resilient means and move said right or left vane into said closely spaced relationship with said hull to form said longitudinally extending slot.

30. A boat as claimed in claim 29, wherein said other end of said vane is connected to the rear wall of the boat by means of a pair of rods slidably passing through holes provided in one of the arms of an angle bracket, the other arm of said bracket being secured to the rear wall of the hull, said resilient means being springs placed around said rods and above said bracket, one end of a spring resting on the arm of said bracket provided with the holes for the passage of said rods and the other end of the spring abutting against a bar interconnecting the free ends of said rods.

31. A boat as claimed in claim 30 wherein said means provided on the longitudinal interior edge of a vane is formed by the beveled shape of said interior edge.

32. A boat as claimed in claim 31, wherein the vanes are hinged to the bottom of the hull substantially at the center of the hull.

33. A boat as claimed in claim 1, wherein said boat is provided at its bottom lateral edges with grooves, and wherein each of said vanes comprises three parts, two lateral parts and a median part, the two lateral parts being respectively hinged to the median part, and the median part of each vane being connected to the bottom of the hull by said supporting means, each vane facing a corresponding groove thus closing the corresponding groove and restoring the normal non-grooved shape of the hull, a resilient means system being provided for pivotally connecting the rear end of the lateral hinged parts of each vane to the rear wall of the hull, said resilient means system urging each vane into its closing position of the corresponding groove when the boat is at rest or when it is running in a straight line, means being provided on the longitudinal interior edge of the interior lateral hinged part of each vane which extends towards the center of the boat, and being operable by water pressure during the negotiating of a right or left turn curve by said boat to oppose said resilient means and open the said hinged lateral parts of a right or left vane, thus forming said longitudinal slot.

34. A boat according to claim 33, wherein said resilient means system comprises a lever-arm and a stop-spring connecting the interior lateral part of the vane to the rear wall of the boat, and a further stop-spring connecting the exterior lateral part of the vane to the rear wall of the boat, said resilient means system automatically providing the pivoting of the lateral parts of the vane under the action of the water pressure created when negotiating curves thus forming said longitudinal slot.

35. A boat according to claim 34, wherein said stop-spring comprises two U-shaped staples slidably coupled to each other with their closed ends remote from each other, each staple having a hooked end, a coil being provided between the two hooked ends of said staples.

36. A boat as claimed in claim 34, wherein said means provided on the longitudinal interior edge of the interior lateral hinged part of each vane is formed by the beveled shape of said edge.

37. A boat as claimed in claim 1, wherein said boat is provided at its bottom lateral edges with grooves, and wherein each of said vanes comprises three parts, two lateral parts and a median part, the two lateral parts being respectively hinged to the median part, and the median part of each vane being connected to the bottom of the hull by said supporting means, each vane facing a corresponding groove thus closing the corresponding groove and restoring the normal non-grooved shape of the hull, a resilient means system being provided for pivotally connecting the rear end of the lateral hinged parts of each vane to the rear wall of the hull, said resilient means system urging each vane into its closing position of the corresponding groove when the boat is at rest or when it is running in a straight line, said resilient means system being connected to a motor of said boat in such a way that if the boat turns to the right the hinged lateral parts of the right vane are pivoted for providing a longitudinal slot between the right vane and the bottom of the hull, and if the boat turns to the left a longitudinal slot is provided between the left vane and the hull.

38. A boat according to claim 37, wherein said resilient means system comprises a cable and pullies system provided at the rear wall of the hull, the cable being connected to said motor controlled by the steering wheel of the boat and to the interior lateral hinged part of each of the right and left vanes, said resilient means system further comprising a stop-spring connected to the exterior lateral hinged part of each vane and a stop-spring connected to the interior lateral hinged part of each vane.

39. A boat according to claim 38, wherein said stop-spring comprises two U-shaped staples slidably coupled to each other with their closed ends remote from each other, each staple having a hooked end, a coil being provided between the two hooked ends of said staples.

40. A boat according to claim 38, wherein said cable is connected to the interior lateral hinged parts of the vanes, respectively, by means of rods, and wherein each vane is connected to the bottom of the boat by means of studs.

* * * * *